United States Patent [19]

Rubio et al.

[11] Patent Number: 5,458,900
[45] Date of Patent: Oct. 17, 1995

[54] METHODS FOR MAKING AREPAS

[75] Inventors: Manuel J. Rubio, Miami Beach, Fla.; Ramiro Montelongo; Roberto C. Medellin, both of Guadalupe, Mexico

[73] Assignee: Roberto Gonzales Barrera, Monterrey, Mexico

[21] Appl. No.: 115,818

[22] Filed: Sep. 3, 1993

[51] Int. Cl.[6] .................................................. A21C 11/08
[52] U.S. Cl. ........................... 426/512; 426/496; 426/516; 425/394
[58] Field of Search .................................... 426/496, 512, 426/516, 279, 283; 425/233, 394, 395, 340

[56] References Cited

U.S. PATENT DOCUMENTS

| | | | |
|---|---|---|---|
| 1,445,187 | 2/1923 | Vaughan | 426/279 |
| 1,515,125 | 11/1924 | Landstra | 425/395 X |
| 3,008,235 | 11/1961 | Royer et al. | 426/512 X |
| 3,159,699 | 12/1964 | Sutphin | 425/395 X |
| 3,317,999 | 5/1967 | Royer et al. | 425/233 X |
| 4,264,292 | 4/1981 | Pisoni | 425/340 X |
| 4,438,686 | 3/1984 | Perez | 99/353 |
| 4,938,126 | 7/1990 | Rubio et al. | 99/349 |
| 5,006,358 | 4/1991 | Rubio et al. | 426/496 |
| 5,211,969 | 5/1993 | Yoshimura | 425/395 |
| 5,269,997 | 12/1993 | Leslie | 425/395 X |

Primary Examiner—Donald E. Czaja
Assistant Examiner—Milton I. Cano
Attorney, Agent, or Firm—William G. Rhines

[57] ABSTRACT

Machines and methods are disclosed for making arepas from corn flour dough in a cavity situated between abutting, opposing forming members. When the forming members are closed, dough occupying the cavity is circular in the plane where said members abut, and is of progressively increasing thickness dimension toward its axis. The forming members are then moved apart from each other and the arepa preform is disassociated from the forming members and its entire outer surface, but not its interior, is cooked using primarily radiant and/or convective heat. In some embodiments, the dough is extruded directly into the cavity while the forming members are already abutting each other. In others, the dough is extruded, a preform plug is severed from the extrusion, the cavity portion of one of the forming members is pressed down against the preform plug while it sits on a distensible surface backed by a backing member having a circular central void. That surface distends into the void so that the distended surface describes the remainder of the cavity. The first forming member is then raised and the deformable surface contracts to a flat condition, so that the uncooked arepa sits on top of that surface for removal and cooking.

8 Claims, 5 Drawing Sheets

METHODS FOR MAKING AREPAS

BACKGROUND OF INVENTION

In certain countries of the world, principally Venezuela and Columbia, a form of foodstuff that is commonly consumed is the so-called "arepa". Almost without exception to date, arepas are made from corn rather than wheat or other grains. More particularly, they are made almost entirely from the starch content of corn, without significant amounts of the hull, oil or germ which also constitute part of the natural kernel corn. Particularly with removal of the hull to make the corn capable of being ground into flour, extraction of the germ to prevent the ground flour from going rancid, and the emergence of chemical processes for hydrogenating the corn oil content to render it into lard and butter substitutes, the remaining starch content has come to be the principal constituent of arepas. Recently, because of the increased attention being paid to good nutrition and the relatively poor food value of this starch, there have been efforts to add food supplements and/or to make the flour to include some or all of the parts of the natural kernels that had come to be eliminated. However, so far, attempts to return part of the germ and/or oil have proved unacceptable because the resulting arepa is yellowish and tends to show black spots on the surface. Acceptance of arepas made by this process is poor because the consuming public currently requires that finished arepas be almost pure white in color with a very smooth texture and an unblemished surface.

Arepas, which commonly (particularly in Venezuela and Columbia) are cooked in individual homes or neighborhood food markets, usually just before they are eaten, are made from a flour that is ground from the starchy parts of kernel corn that is bought in small (1, 5 or 15 kilo) bags in flour form in grocery stores. The flour is combined with water and some salt in a ratio typically of about 1 Kg of flour to 1.3 Liters of water to 15 grams of salt and is mixed for about 1.5 minutes to form a dough. The dough is formed by hand into spherical balls which are then pressed to form a solid that is shaped more or less like that which would result if one were to cut shallow spheroid sections of equal circular base dimensions from such spheres and abut the circular bases of two such sections to each other. Each of the resulting dough pieces is substantially round in horizontal cross-section and about 9–10 cm. (3–3½") in diameter, about 2.5 cm (1") thick at the center, and 90–125 grams (4 oz.) in weight. Most important, they are distinctly convex on both the top and bottom surfaces. In other words, they are substantially bilaterally symmetrical both with respect to the horizontal plane described by the circle which forms the circumference of the horizontal mid-plane and also with respect to the axis of that circle. They are then cooked for 14–18 minutes in reflective or convective heat, with minimal or no conductive heat being applied in order not to burn the outer surface. At that point, the outer surface layer is cooked throughout, and is nearly white in color and of fine texture, while the interior remains substantially uncooked dough. While still hot, the outer surface layer is broken through, typically using one's finger, with which the still doughy center is scooped out and either discarded or eaten, and the arepa is filled with meat, vegetables, grated cheese, etc. and eaten. The nutritional value of the filled arepa derives primarily from the filler, however, since the arepa itself is substantially entirely corn starch.

The forming of the arepa from raw dough to date has only been done successfully in significant quantities by hand. Indeed, it is said in the industry that it is not possible to automate such processes. This is because of the inherent characteristics of the very starchy flour, which produces a dough that is very sticky, and the marketplace commitment to its unique double-convex shape.

Accordingly, it is an object of this invention to provide automated means for making arepas.

Another object of this invention is to provide such means for the complete preparation of arepas through the formation and cooking stages.

Still another object of this invention is to provide means for satisfying one or more of the foregoing objectives that is susceptible to processing flour of improved nutritional value.

STATEMENT OF INVENTION

Desired objectives may be achieved through practice of the present invention, embodiments of which include apparatus and methods for making arepas in which corn flour is mixed with other ingredients, such as water and salt, to produce dough which is then formed into arepas in a cavity situated between abutting, opposing forming members. The cavity, when the forming members are closed with dough occupying the cavity, is of predetermined dimensions, is substantially circular in the plane where said members abut, is substantially bilaterally symmetrical with reference both to said plane and the central axis of that circular portion, and, axially from that plane, is of progressively increasing thickness dimension proceeding from said edge of said circle toward that axis. The forming members are then moved apart from each other by a distance at least equal to the axial dimension of the cavity and the arepa preform is disassociated from the forming members and its entire outer surface, but not its interior, is cooked using primarily radiant and/or convective heat, but not conductive heat to any significant extent. In some embodiments, to form the arepa from dough, the dough is extruded directly into the cavity while the forming members are already abutting each other. In others, the dough is extruded through an orifice, a preform plug of dough is severed from the extrusion, the cavity portion of one of the forming members is pressed down against the preform plug while it sits on a distensible surface, such as a rubber belt, where it is backed by a backing member having a circular central void corresponding in location and peripheral diameter and shape to that of the first forming member. That surface distends into the void in the backing member in response to the dough preform acting on it as a result of pressure being applied by closure of the first forming member. In so doing, the distended surface describes the remainder of the cavity. In alternative embodiments, the backing member may be in the form of a simple ring, or of a concave depression corresponding in shape and dimensions to the cavity in the first forming member. The first forming member is then raised sufficiently for the deformable surface to contract to a substantially flat condition, as a result of which the uncooked arepa sits on on top of that surface, ready for removal and cooking as described above.

DESCRIPTION OF DRAWINGS

This invention may be understood from the description which follows and from the accompanying drawings in which.

DESCRIPTION OF PREFERRED EMBODIMENTS

Figures 1, 2:
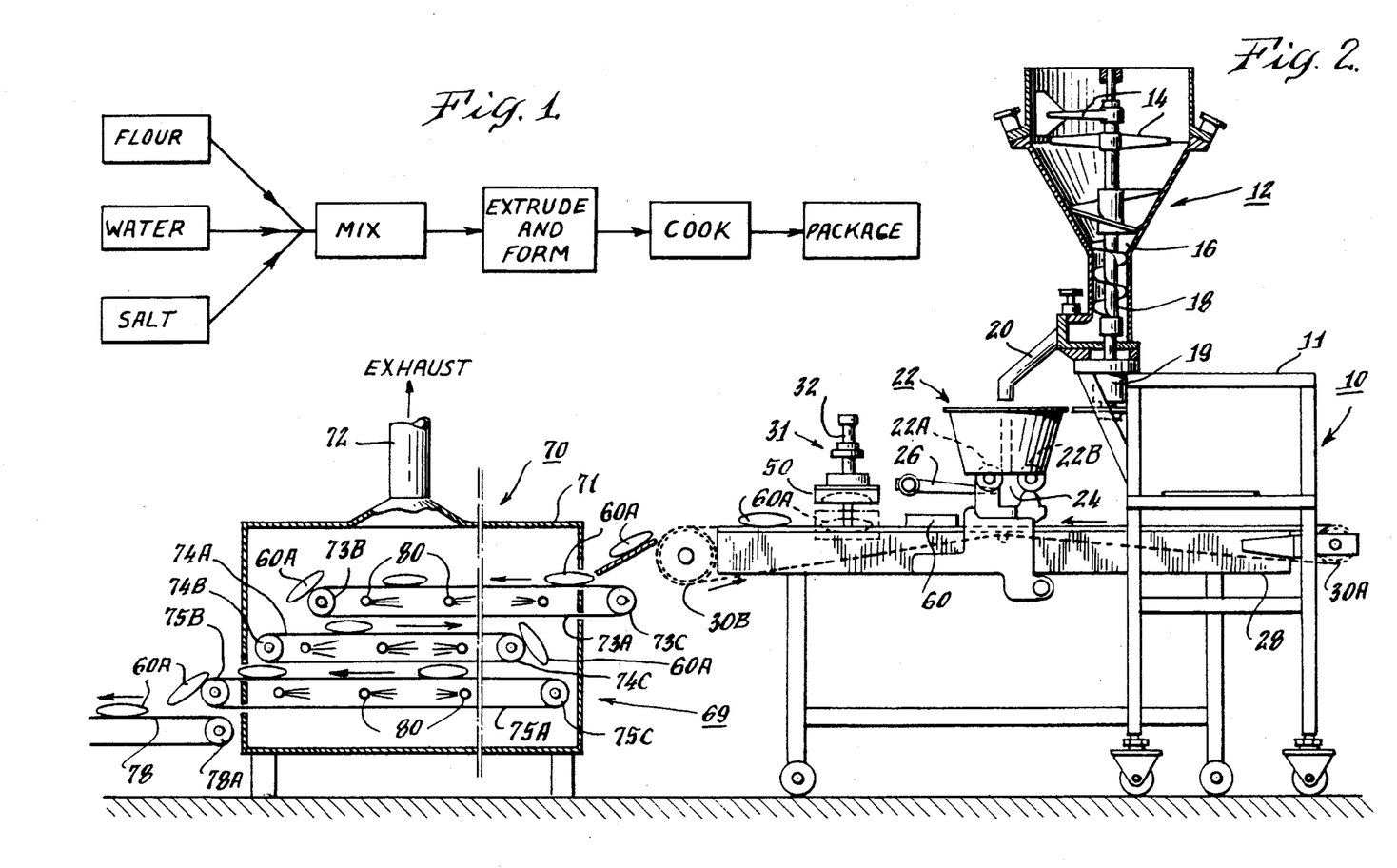
FIG. 1 is a method flow diagram applicable to embodiments of this invention.
FIG. 2 is a cross-sectional view of an embodiment of this invention.

Referring first to FIG. 1, there is shown a flow diagram of methods embodying the present invention, As shown, flour, typically made from the starchy portion of corn, is mixed for about 1½ minutes with water and salt to form a dough. A typical ratio of these ingredients is 20 kg. (44.5 lbs.) of corn flour to 26 liters (6.4 gals.) of water to 300 grams (0.63 lbs) of salt. The dough is then extruded and formed into arepas. As will be apparent form the description which follows, this phase of the operation is of particular interest in the practice of this invention and may be performed in a variety of ways. The arepas so formed are then cooked in a manner especially suited to this product, so that the entire outside layer is cooked while the core beneath that layer remains as raw dough, using convective and/or radiation heat rather than conductive heat. So formed, the arepas may then be "cored" immediately to remove the uncooked, central dough portion, or they may be simply packaged as is and frozen or otherwise shipped out in condition for subsequent re-heating and use.

FIG. 2 illustrates one embodiment of this invention that embodies this invention. There is shown a forming machine 10 which has a main frame 11 to which are affixed the various machine components. These include a mixing unit 12 into which the components of the dough may be put, to be preliminarily mixed by the mixer blades 14 and and forced out through the feed spout 20 through operation of the feed screw 16 which, like the mixer blades 14, is activated by a common drive shaft 18 that is driven as is known per se by a drive motor 19. The dough exiting through the feed spout 20 falls into a hopper before being passed through an orifice 24, which, desirably for making arepas, is round in cross-section. When a desired length of the extruded cylinder of raw dough has passed through the orifice 24, the reciprocation cutting device 26 moves its associated cutting wire horizontally, thus severing an arepa preform 60 of raw dough from the endmost part of the extruded dough cylinder. The preform 60, shaped like a short truncated cylinder, drops by gravity onto a step-moving conveyor belt 28 that is motor driven about rolls 30A, 30B, which moves it to the location of the forming mechanism 31, the operation of which will be explained in detail presently. There the preform 60 is formed into a raw dough arepa 60A that is transported by the conveyor 28 to the cooking oven 70. This oven 70 includes an outer wall 71, and exhaust stack 72 by which hot gas is removed from the oven, and internal heat sources such as the gas jets 80. It also includes conveyor belts 73A, 74A, 75A which are made from material such as steel "mail" that is flexible and yet well adapted to function in the high heat environment of the oven interior. The belts are oriented horizontally within the oven, one above the other. Typical temperatures at which the belts 73A, 74A and 75A operate are 300 C., 320 C., and 265 C. respectively. As such, the belts may be driven about their respective carrier rolls: i.e., belt 73A about rolls 73B and 73C; belt 74A about rolls 74B and 74C; and belt 75A about rolls 75B and 75C. It is to be noted that each of these belts, in side cross-section, is offset from and moves in the opposite direction from each of the other belts that is adjacent to it. Thus, belt 73A moves from right to left as shown and projects at the right through the oven wall 71 so as to receive raw dough arepas from the conveyor belt 28. However, arepas riding on belt 73A reach its carrier roll 73B short of the farthest left hand extent of belt 74A. Therefore, the now partially cooked arepa, when it falls away from belt 73A as it passes over the roll 73B, turns upside down as it lands on the top surface of belt 74A which moves from left to right as shown. A similar relationship exists between the belt 74A and the belt 75A, which extends out through and past the left wall of the oven, where the now cooked arepas being carried by belt 75A are transferred to a conveyor belt 78 as it moves about its associated carrier roll 78A for removal to be packaged and/or otherwise further processed.

An important feature of ovens desirably used in connection with this invention is that they supply cooking heat for the arepas that is substantially entirely reflective and/or convective, rather than being conductive, since it is important to the marketability of arepas that they be nearly white and smooth textured in appearance without having a significantly brown color or "baked" appearance. To that end, it is to be noted that as shown in FIG. 2, ovens used in practicing this invention are preferably fired by gas jets as shown which do not (as is the usual case) supply flame directly on the conveyor belts. Instead, they are turned to the side or otherwise have their flames diverted, as by baffling or the like, so that the conveyor belts function primarily as carriers and not as cooking heat sources themselves.

Figure 3:
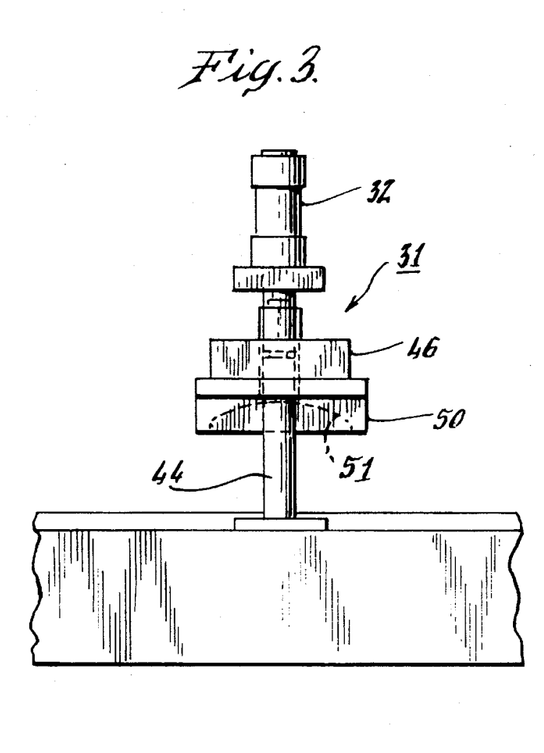
FIG. 3 is a side cross-sectional view of a portion of the embodiment of this invention shown in FIG. 2.
Figure 4:
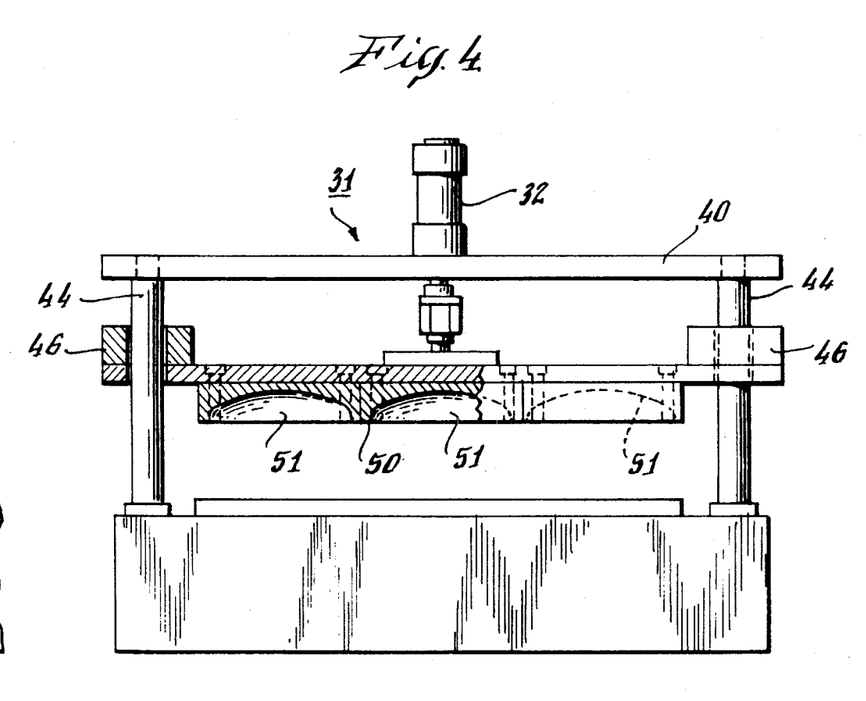
FIG. 4 is a front cross-sectional view of the portion that is depicted in FIG. 3 of the the embodiment of this invention shown in FIG. 2.

FIGS. 3 through 8 shown in greater detail, forming mechanisms 31 useful in embodiments of this invention of the type shown in FIG. 2. FIGS. 3 and 4 shown an upper forming member 50 that is supported by a frame 40 having vertical support posts 44 along which the forming member support 42 is vertically slideable, with alignment control provided by the slider blocks 46. (As shown in FIG. 4, several such forming members are located side by side, in a single row, in the same block, but of course, one or more such structures, as one or more separate blocks, or square or rectangular groups of blocks, singly or as part of a common structure may be utilized, in one or more production lines which run simultaneously.) The support 42 is actuated to move vertically upward and downward by means of actuator rod 32 which, in turn is cyclically motor driven so that as the associated conveyor belt 28 steps forward and positions an arepa preform 60 beneath the forming member 50 and then stops, the forming member, which will have been raised out of the way, moves downward to impinge upon the arepa preform. The synchronization of belt movements, extrusion heat cutter, and forming members all my be achieved by known per se means, such as electronics, microswitches, cam mechanisms, etc. The forming member 50 has a downward facing cavity 51 which is substantially circular at the flat plane described by the bottom face of the forming member 50, and is of progressively greater depth in the direction of the axis of that circle as one moves from the peripheral edge of the cavity toward that axis. Another way of stating this configuration is that a cross-section taken through the axis is bilaterally symmetrical about the axis. The resulting concave cavity is of such configuration and is so dimensioned as to correspond to the desired size and shape of the uncooked arepa that is to be formed, taking into account the shrinkage in dimensions that will occur upon it being cooked while preserving the double convex configuration which characterizes the arepa when finished.

Figure 5:
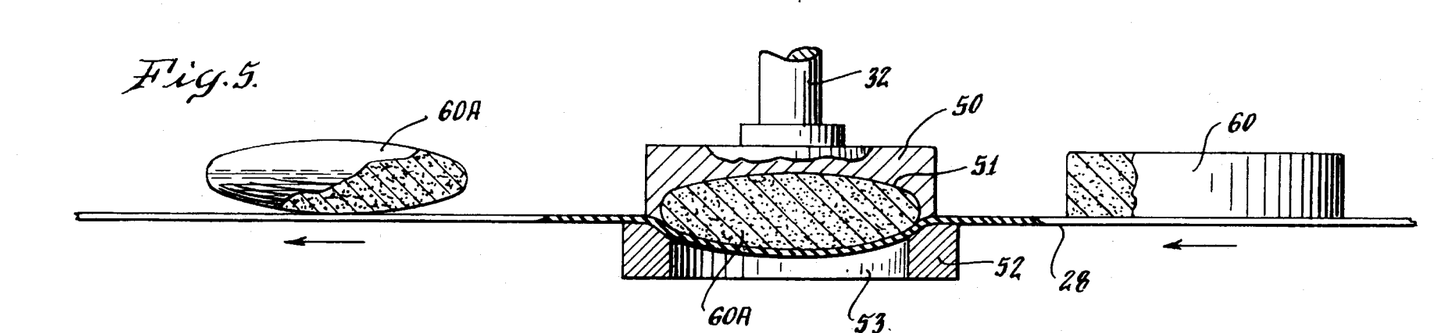
FIG. 5 is a side cross-sectional view of an embodiment of this invention of the type shown in FIG. 2 in the region of the portions thereof shown in FIGS. 3 and 4.
Figure 6:
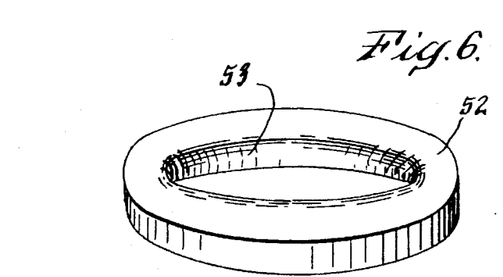
FIG. 6 is a perspective view of a ring-like backing member of the type shown shown in FIG. 5.

This last characteristic of double convexness in the finished product may be achieved as shown in FIGS. 5 through 8; FIGS. 5 and 6 being directed toward one embodiment, and FIGS. 7 and 8 to another. FIG. 6 depicts a ring-like backing member 52, which has an aperture 53 therethrough. As such, as is shown in FIG. 5, the backing member 52 is positioned so that its interior aperture is aligned vertically with the cavity in the top forming member 50. At this point, it may be well to note that desirably the corner between the top of the backing member 52 and the interior aperture 53 is "broken" or somewhat rounded, and that the diameter of the inside aperture 53 desirably may be (as is shown) slightly smaller than the diameter of the circle described by the cavity in the upper forming member 50. This is to accommodate the interposition of the distended portion of the carrier belt 28 as hereinafter described, so that the formed, uncooked arepa will be substantially bilaterally symmetrical with respect to the plane described by the circumference of the formed arepa (i.e., the portion of the arepa that is adjacent to the abutment of the two forming members).

The conveyor belt in this embodiment is made from a material which, in addition to such desired properties as durability, abrasion resistance, flexibility, smooth surface, etc. which adapts it for its intended use, is locally distensible. That is, it is capable of being stretched out of shape in an isolated area in response to the application of localized pressure, and of recovering its original shape ("contracting") when that pressure is removed. An endless rubber belt is an example of a structure which can be made to meet these criteria. Thus, as is shown in FIG. 5, when an arepa preform 60 has been transported to a position between the forming members when they are retracted apart from each other and the top forming member 50 has closed down upon the arepa preform, the preform, being still in the dough state, will assume the contour of the cavity 51 in the forming member 50. At the same time, the pressure transmitted downward from the top forming member 50 via the arepa dough to the underlying conveyor belt 28, will cause the conveyor belt 28 to become distended throughout the region of the aperture 53 in the backing member 52 where it is unsupported against so distending. By careful design as to the belt 28 and its constituents, the amount and configuration of such distention may be made to cause the upward facing surface of the distended portion of the belt to replicate substantially the contour and dimensions of the cavity in the upper forming member 50. Thus, by this means, the backing member 52 acting in concert with the conveyor belt 28 effectively becomes a forming member with a cavity, corresponding in dimensions and configuration to those of the upper forming member 50.

Figure 7:
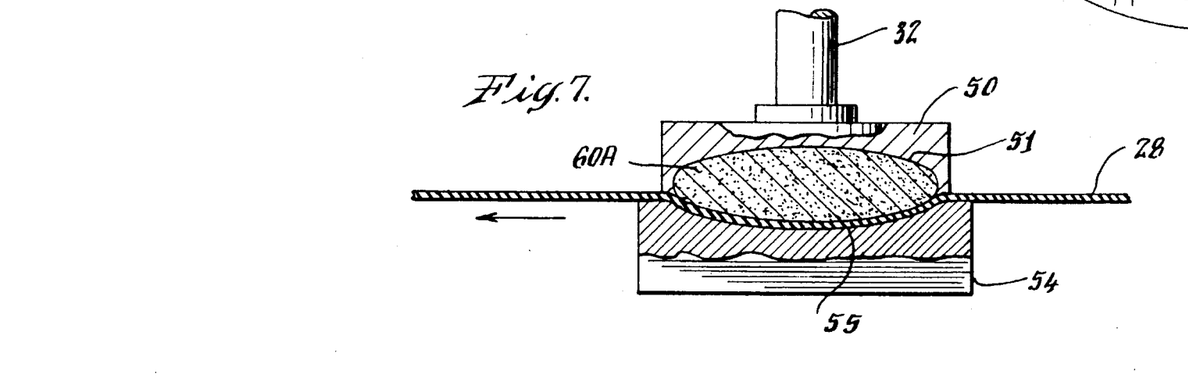
FIG. 7 is a side cross-sectional view of another embodiment of this invention of the type shown in FIG. 2 in the region of the portions thereof shown in FIGS. 3 and 4.
Figure 8:
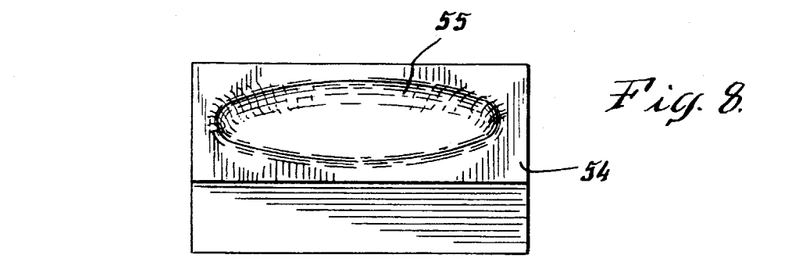
FIG. 8 is a perspective view of a concave depression type backing member of the type shown shown in FIG. 7.

This approach may be even further simplified by using embodiments of the type shown in FIGS. 7 and 8. There, the backing member 54 has a cavity with a solid wall 55 that is like the cavity in the forming member 50 except that it is sufficiently larger in depth and circular dimension to accommodate the thickness of the belt 28 while still producing a formed arepa that is substantially bilaterally symmetrical and convex with reference to the plane of the circle described by the circumference of the circular section of the arepa. This approach has the advantage of easing the distention characteristic requirements of the belt 28 and of interdicting unwanted and/or excessive distortion due to belt fatigue, thereby stabilizing production uniformity and lengthening the life of the production constituents.

In both of these embodiments, the downward pressure of the upper forming member 50 via the dough produces the distension that causes the lower assembly to become a forming member corresponding to the upper one. As soon as that pressure is removed, the belt, one of whose characteristics is "memory" to contract, flattens out substantially to its original flat shape. This elevates the formed, uncooked arepa 60A so that it sits above the belt 28 on one of its convex surfaces without that surface exhibiting significant flattening. It is therefore then properly shaped for the ensuing cooking cycle.

Figure 9:
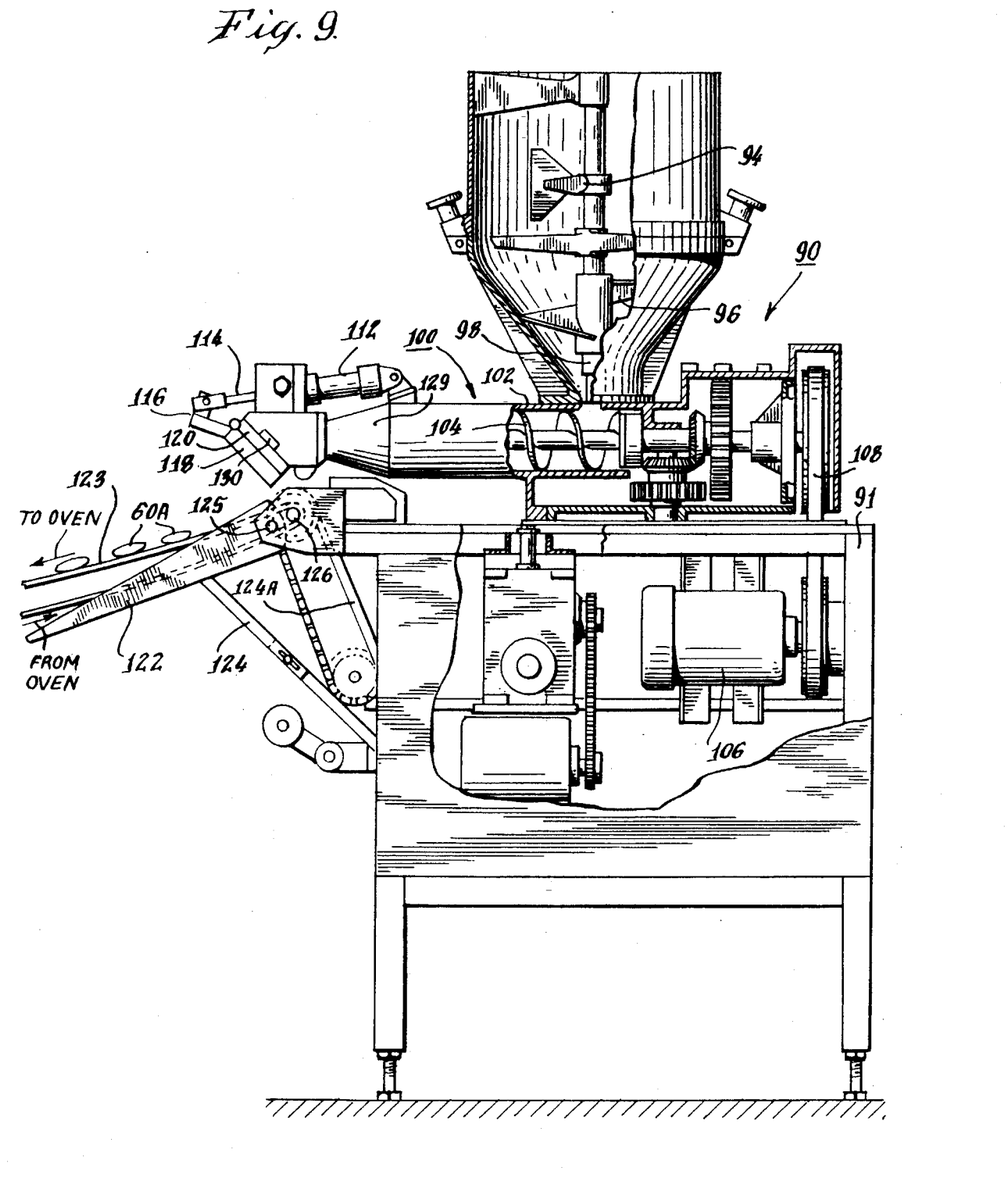
FIG. 9 is a cross-sectional side view of another embodiment of this invention.
Figure 10:
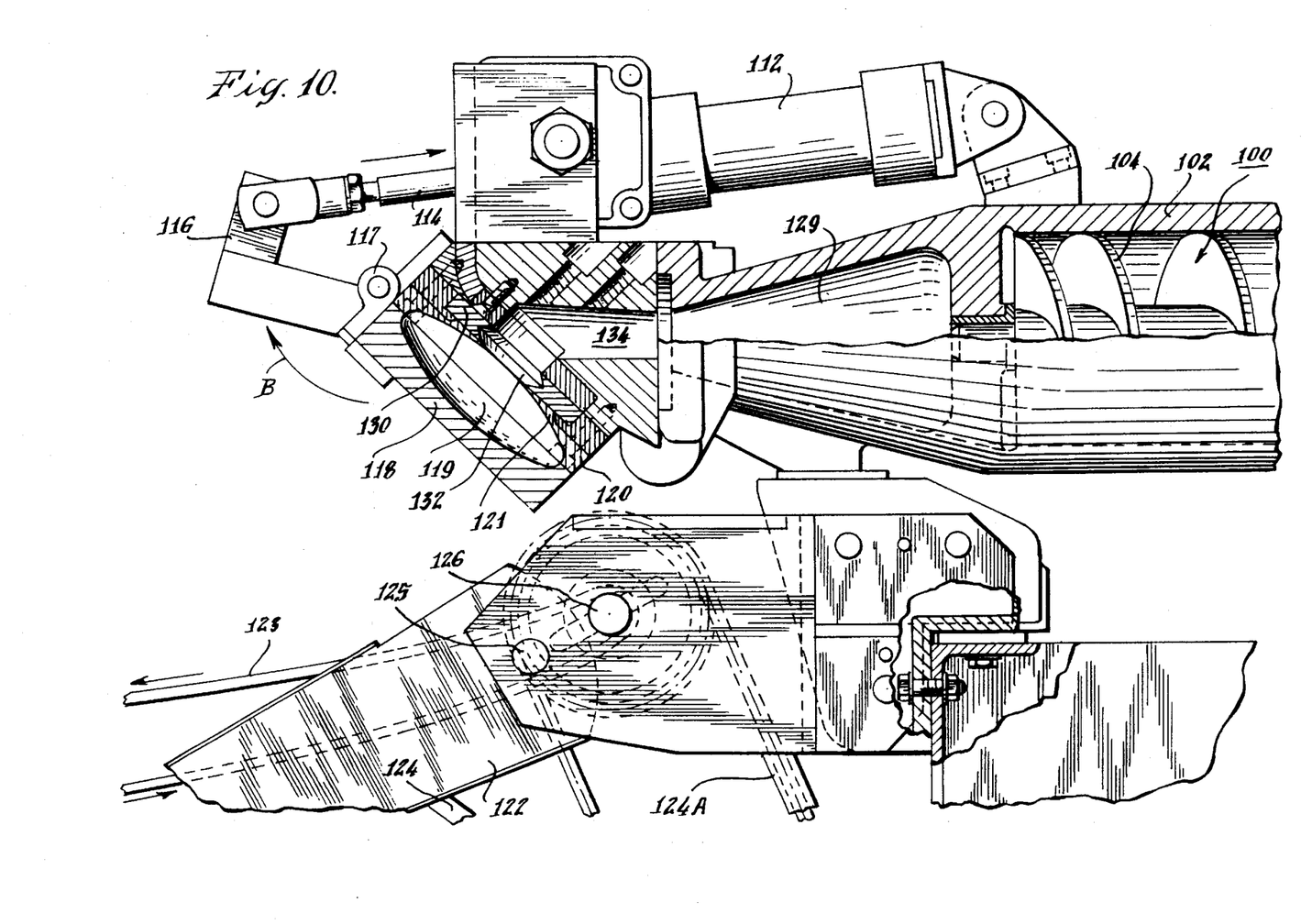
FIG. 10 is a side cross-sectional view of a portion of the embodiment of this invention shown in FIG. 10.

FIG. 9 illustrates an arepa forming machine 90 which is another embodiment of this invention. It includes a machine frame 91 to which the various components of the machine are affixed, a mixer 92 into which flour ingredients of the type and in the proportions heretofore described are placed to be mixed by mixer blades 94 into a dough which is then forced into an extruder 100 by a screw mechanism 96 which, along with the blades 94, are driven by a drive shaft 98. The extruder 100 comprises an outer housing 102 in which is positioned an extruder screw 104 for causing the mixed dough to be forced into the portion of the mechanism that is shown in greater detail in FIG. 10. As will be seen from the latter figure in particular, dough is forced by the extruder screw 104 into the chamber 129, and thence through the extruder tip 134 into the cavity formed by the inner surfaces 121, 119 respectively of the closed, abutting forming members 118, 120 which are closed so as to form a continuous cavity between them out of the half-cavities in each. As this happens, the flat plate cut off valve 130 is in the "open" position; i.e., it presents its aperture 132 to the dough being extruded into the forming cavity from the extruder 100 so the the dough is free to fill the forming cavity. Thereafter, the flat plate of the cut-off valve 130 moves laterally so that an unapertured portion of the valve plate simultaneously blocks the further flow of dough into the forming cavity and cuts the dough clean from the innermost part of the cavity surface 121, thus imparting a smooth, continuous outer surface to the formed arepa at that point. The pneumatic cylinder 112 is then actuated, causing the piston rod 114 to retract into the cylinder 112 (in the direction of arrow "A") and, via the linkage 116, the forming member 118 to pivot open about the pivot pin and hinge 117 (in the direction of arrow "B"). This permits the formed arepa to fall by gravity to a metal conveyor belt 123 that travels about the fixed bar 126 and carries the raw arepas through the associated oven of the type shown in FIG. 2 during the cooking operation and, optionally, other equipment for further processing. The belt 123 is positioned within the chute 122 which is adjustable for height by means of adjustable bar 124, and moveably connects by pivot pin 125 to a part of the apparatus that is supported by fixed braces 124A.

Various other features may be included in embodiments of this invention. For example, it may be desirable to line or coat the interior surfaces of the forming cavities described, including the surface of a conveyor belt of the type illustrated in FIGS. 2 through 8, with teflon sheeting or cloth, or otherwise render them more stick resistant.

The products of these methods may be made to have a shelf life of as long a three weeks before any molding or other adverse bacteriological processes start, by keeping them cool, adding arresters, and other known per se means. This, than, makes it possible to mass produce arepas and to distribute them widely from such mass production points, thus radically reducing the amount of labor, and therefore the cost, that is involved in producing them individually at the point of consumption. Further, they may be made more nutritious since, through the practice of this invention, it is possible to make arepas that are commercially acceptable from the standpoint of color, appearance, texture, taste, etc. while using such things as Mexican "Maseca" whole kernel flour rather than Venezuelan de-germed flour. Further, this result may be achieved without resorting to nutritional additives, which have the effect of discoloring badly during the cooking process. Products according to this invention may be reheated when it is desired to use them, by microwave or other procedures which do not "bake" or otherwise alter materially their texture, appearance, color or flavor.

EXAMPLE

A mixture was made of 20 kg. of Venezuelan arepa corn flour, 26 L. of water and 300 gr. of salt. The mixture was processed in apparatus of the type depicted in FIG. 2, using a mixing time of 1½ minutes, a time in the mold of 8.5 seconds, and a production rate with one forming member set of 24 arepas per minute. The temperature at the oven conveyor belts was 300 C. for the top belt, 320 C. for the middle belt, and 265 C. for the bottom belt. The cooking time was about 14 minutes. The internal temperature of the arepas exiting the oven was 85–88 C. The percentage of moisture in the raw flour was 10.2%, in the dough was 60.3–61.6 %, and for the cooked arepas was 58.3–58.8 %, indicating a weight loss in cooking of about 3–4.5 %. The arepas produced were 1.0–1.2 cm. in height, and 9.0–9.8 cm. in diameter, and of marketable quality, color and texture.

It is to be understood that by "substantially" as used herein is meant that although the condition or state of affairs to which it refers is perhaps not literally totally so, any shortfall therefrom is not significantly materially adverse to the desired result or effect.

Thus, it is to be understood that the embodiments of this invention herein described, depicted and discussed are by way of illustration and not of limitation, and that a wide variety of embodiments may be made without departing from the spirit and scope of this invention.

We claim:

1. A method of making a raw arepa comprising the steps of
   pre-mixing corn flour dough in a mixer;
   extruding said dough;
   causing said dough to fill a forming cavity for forming said raw arepas that is situated between abutting opposing surfaces of forming members and, when said members are abutting with said dough filling said cavity, is of predetermined dimensions, is substantially circular in cross-section taken along the plane where said members abut, is substantially bilaterally symmetrical with reference both to said plane and the central axis of the circle described by said cross-section, and is of increasingly greater dimension in the direction of said axis proceeding from said edge of said circle toward said axis;
   causing said opposing surfaces of said forming members to be moved out of abutment with and spaced apart from each other sufficiently for the formed raw arepa to be removed without interference from said forming members; and
   removing said raw arepa from said forming members.

2. The method according to claim 1 including the added step of cooking the entire outer surface of said raw arepa without cooking the interior thereof, using heat that is selected from from the group consisting of radiant heat, convective heat, and combinations thereof.

3. The method according to claim 1 wherein said step of causing said corn flour dough to fill said cavity further comprises the step of extruding said dough through an orifice into said cavity while said forming members are abutting each other.

4. The method according to claim 2 wherein said step of causing said corn flour dough to fill said cavity further comprised the step of extruding said dough through an orifice into said cavity while said forming members are abutting each other.

5. The method according to claim 1 wherein said step of causing said corn flour dough to fill said cavity comprises the steps of:
   causing said dough to be extruded through an orifice to form an extrusion of dough;
   causing a preform plug to be severed from said extrusion and to be positioned opposite a portion of at least one said forming members, which portion forms part of said cavity;
   causing said cavity portion of said one of said forming members to press against said preform plug while said plug sits on a distensible surface that is backed by a backing member having a substantially circular central void which causing the distention of said surface that is induced thereby to correspond in dimension, shape and position to that of said cavity portion of said at least one of said forming members and thereby to form said raw arepa,
   and causing said cavity portion of said at least one of said forming members to be removed sufficiently from said surface for the raw arepa formed from said dough to be removed without interference by said forming members as said surface contracts to a substantially flattened condition with said raw arepa resting on said surface.

6. The method according to claim 2 wherein said step of causing said corn flour dough to fill said cavity comprises the steps of:
   causing said dough to be extruded through an orifice to form an extrusion of dough,
   causing a preform plug to be severed from said extrusion an to be positioned opposite a portion of at least one of said forming members, which portion forms part of said cavity;
   causing said cavity portion of said one of said forming members to press against said preform plug while said plug sits on a distensible surface that is backed by a backing member having a substantially circular central void, causing the distention of said surface that is induced thereby to correspond in dimension, shape and position to that of said cavity portion of said at least one of said forming members and thereby to form said raw arepa,
   and causing said cavity portion of said at least one of said forming members to be removed sufficiently from said surface for the raw arepa formed from said dough to be removed without interference by said forming members as said surface contracts to a substantially flattened condition with said raw arepa resting on said surface.

7. The method according to claim 5 wherein said central void has a solid concave wall which, when lined with said distended surface, describes a cavity corresponding substantially in dimensions, location and configuration to that of said cavity portion of said at least one of said forming members.

8. The method according to claim 6 wherein said central void has a solid concave wall which, when lined with said distended surface, describes a cavity corresponding substantially in dimensions, location and configuration to that of said cavity portion of said at least one of said forming members.

* * * * *